United States Patent

[11] 3,604,762

[72] Inventors Noriyoshi Ando;
Kazu Majima, both of Kariya-Shi, Japan
[21] Appl. No. 842,131
[22] Filed July 16, 1969
[45] Patented Sept. 14, 1971
[73] Assignee Nippon Denso Kabushiki Kaisha
Kariya-shi, Japan
[32] Priority Oct. 31, 1968
[33] Japan
[31] 43/79446

[54] ANTISKID DEVICE
5 Claims, 3 Drawing Figs.

[52] U.S. Cl. .................................................... 303/21 BE,
188/181 A
[51] Int. Cl. .................................................... B60t 8/12
[50] Field of Search.......................................... 188/181,
181 A, 181 C; 303/21, 21 A, 21 BB, 21 CG

[56] References Cited
UNITED STATES PATENTS
3,017,145  1/1962  Yarber .......................... 303/21 (A4)
3,401,984  9/1968  Williams et al. ............... 303/21 (A4)
3,507,544  4/1970  Wakamatsu et al. .......... 303/21 (CG)

*Primary Examiner*—Milton Buchler
*Assistant Examiner*—Stephen G. Kunin
*Attorney*—Cushman, Darby and Cushman ABSTRACT: An antiskid device comprising an angular deceleration detector adapted to provide a braking force releasing signal when the angular deceleration of the wheel has exceeded a predetermined value, and a vehicle deceleration detector adapted to change said predetermined value in response to the rate of decrease in the speed of the vehicle, whereby said predetermined value is set to a lower value where the coefficient of road adhesion is low and a locked wheel is liable to occur such as in the case of a snowy frozen road surface and said predetermined value is set to a higher value where the coefficient of road adhesion is high and a locked wheel is not likely to take place, such as in the case of a dry asphalt road surface.

ANTISKID DEVICE

BACKGROUND OF THE INVENTION

1. Field of the Invention

The present invention relates generally to antiskid devices and more particularly to an antiskid device designed such that when the angular deceleration of the wheel has exceeded its predetermined value, the braking force on the wheel is released and said predetermined value is simultaneously set to a higher level and, in addition, said predetermined value is automatically and continuously changed in response to the rate of deceleration of the vehicle to compensate for varying road surface conditions. When the wheel stops rotating after the angular deceleration of the wheel has reached said predetermined value, the braking force applied to the wheel continues to be released until the wheel to prevent a locking of the wheels during a brake release period from causing a dangerous reapplication of the brakes in the absence of a further wheel deceleration starts rotating again, whereupon the braking force is applied again on the wheel.

2. Description of the Prior Art

In the past, the purpose of antiskid devices for vehicles has been concerned with the problem of how to slow down the speed of a vehicle without causing the wheel to stop rotating when the brakes are applied to the vehicle. In many of these antiskid devices, the angular deceleration of the wheel driving shaft correlated to the peripheral wheel deceleration $m/s^2$ of the vehicle has been detected by means of a flywheel mechanism and utilized in a manner designed to reduce the braking force applied to the wheel through a hydraulic or electromotive transmission mechanism and the like to thereby prevent inoperability or irregular gyration of the vehicle body due to the stoppage of rotation of the wheel under an excessively large breaking force.

FIG. 1 is a block diagram of a conventional electromagnetic antiskid device adapted for use with airbrake system and air-servo hydraulic brake systems, for example, and FIG. 2 is a view showing the construction of the wheel driving shaft angular deceleration detector in the device of FIG. 1 and an electrical connection diagram including said detector. The angular deceleration detector is designed to function so that when an angular deceleration occurs to a shaft 12 coupled to the wheel-driving shaft, a rotational torque is developed in a flywheel 13 and relative rotational movement takes place between the flywheel 13 and the shaft 12 until the return spring 14 is overcome, whereupon the flywheel is displaced. This rotational movement is effected along the thread thus causing the flywheel 13 to move axially along the shaft 12 (in the direction of arrow A). This axial movement is amplified by means of a lever 15 so as to be used as a driving force to close an electrical contact 16. Numeral 2 designates a relay adapted to permit a current to flow from a power source 1 to a solenoid valve 3 upon closing of the electrical contact 16. The solenoid valve 3 is a type of three-way valve so that when the valve is deenergized it provides communication from an air tank 5 to a brake chamber 8 through a brake valve and when the valve is energized it closes on the side of the air tank 5 and communicates the brake chamber 8 to an exhaust port. Numeral 7 designates a pilot lamp which indicates the operation condition of the solenoid valve 3. When braking action takes place in this device, air is permitted to flow into the brake chamber 8 from the air tank 5 through the solenoid valve 3 and the braking force is applied to the wheel. The circuit is then closed to the solenoid valve 3 when a predetermined angular deceleration occurs to the shaft 12. When this happens, the air pressure in the brake chamber 8 is reduced with a resultant decrease in the braking force. Thus, the wheel-driving shaft is prevented from halting its revolution. However, since a control device of this kind has been designed to release the braking force on the wheel only when a wheel angular deceleration signal 4 is generated, there are disadvantages in that the conditions for providing maximum effective braking are extremely limited and that satisfactory antiskid action is not equally obtainable under different circumstances in which the coefficients of friction between the wheel and the road surface vary considerably, such as in the case of a concrete-paved road surface and a snowy frozen road surface.

For example, if the value at which a wheel angular deceleration signal will be generated is predetermined such that a braking force is obtained which is effective on a concrete-paved road surface and the like where the coefficient of friction is high, the wheel inevitably tends to stop rotating within a very short period of time on a snowy frozen road surface, where the coefficient of friction is low, because of poor responsiveness due to the angular deceleration detector being composed of machine elements such as a screw which involves a large frictional force and of the delayed action of the exhaust system including the brake chamber, and other parts.

Moreover, experience with conventional devices has shown that on a frozen road surface, etc., it is possible the wheel is caused to stop rotating due to the delayed action of the brake mechanism and the like, even though the wheel has stopped rotating without the occurrence of any angular deceleration in excess of a predetermined value and the braking force has been released upon energization of the solenoid valve. This involves the danger that the vehicle will skid with a locked wheel because there is no longer developed any angular deceleration of the wheel and the braking force is applied again to the wheel.

Of course, the wheel will not stop rotating even on a snowy frozen road surface, etc., if the value is predetermined so that the angular wheel deceleration signal is provided for a very small angular deceleration. But this involves the problem of considerably extending the distance required for the car to be brought to a standstill, which is an especially big difficulty on a concrete-paved road surface, and thus the effectiveness of the antiskid action would be ruined.

SUMMARY OF THE INVENTION

One object of the present invention is to provide an antiskid device comprising an angular wheel deceleration detector adapted to provide a braking force releasing signal when the angular deceleration of the wheel exceeds a predetermined value and a vehicle deceleration detector adapted to detect the deceleration of the vehicle to change said predetermined value in accordance with the thus detected deceleration.

According to the present invention, such predetermined value can be at all times set to a proper value according to the coefficients of road adhesion such that said predetermined value is set to a lower level on a snowy frozen road surface and the like where the coefficient of road adhesion is low and the wheel tends to be locked, whereas said predetermined value is set to a higher level on a dry asphalt road surface, for example, where the coefficient of road surface is high and a locked wheel is unlikely to take place.

Another object of the present invention is to provide an antiskid device further including switching means adapted to be energized by the said braking-force-releasing signal and braking-force-releasing means adapted to be energized upon the conduction of said switching means to operate in a manner designed to release the braking force.

According to the present invention, locked wheels can be avoided by providing a braking-force-releasing signal to operate said braking-force-releasing means.

A further object of the present invention is to provide an antiskid device wherein feedback is applied to the said angular wheel deceleration detector by the conduction of the said switching means to change said predetermined value.

According to the present invention, if the angular deceleration developed in the wheel is so large, as will be the case on a snowy frozen road surface, that it readily exceeds a second predetermined value after the changeover, the braking-force-releasing means will continue to operate as long as the second predetermined value is exceeded, while on the other hand the braking-force-releasing means will be operated intermittently if the angular deceleration developed in the wheel is relatively small, such as in the case of a dry asphalt road surface, so that is is higher than a first predetermined value before the changeover, but does not reach a second predetermined value after the changeover. By reducing the mean value of the conduction periods of the braking-force-releasing means in this manner, the vehicle can be brought to a stop without remarkably extending the stopping distance but within a comparatively short stopping distance, whereby the vehicle can be always braked safely and efficiently under different circumstances where the coefficients of road adhesion vary considerably. These are the excellent effects attributable to the present invention.

A still further object of the present invention is to provide an antiskid device further including a signal delay circuit provided between the said angular wheel deceleration detector and switching means and adapted to enable the passage of a braking force releasing signal only when said braking-force-releasing signal continues over a certain period of time.

According to the present invention, an excellent effect is obtained in that when the angular wheel deceleration exceeds a first predetermined value and there is provided a braking-force-releasing signal because of the unsteady rotation of the wheel during retardation of the vehicle, any erroneous operations due to such braking-force-releasing signal can be effectively prevented.

Still further object of the present invention is to provide an antiskid device further including a wheel rotation detector adapted to detect whether the wheel is revolving, whereby the energization of said braking-force-releasing means is maintained through said switching means by the output of said wheel rotation detection circuit which is produced by the conduction of said switching means caused by the braking-force-releasing signal and the stoppage of rotation of the wheel.

According to the present invention, enhanced effectiveness is obtained in that when the wheel stops rotating upon emergency application of the brakes, continued releasing of the braking force applied on the wheel is maintained until the wheel starts rotating again to thereby prevent the vehicle from skidding.

DESCRIPTION OF THE PREFERRED EMBODIMENT

Figure 1:
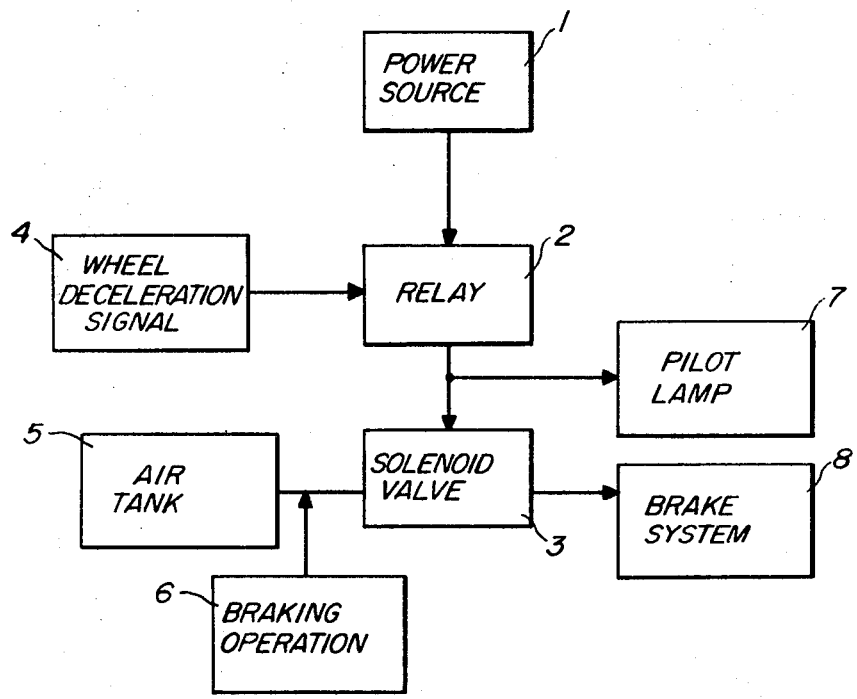
FIG. 1 is a block diagram showing a conventional antiskid device for vehicles.
Figure 2:
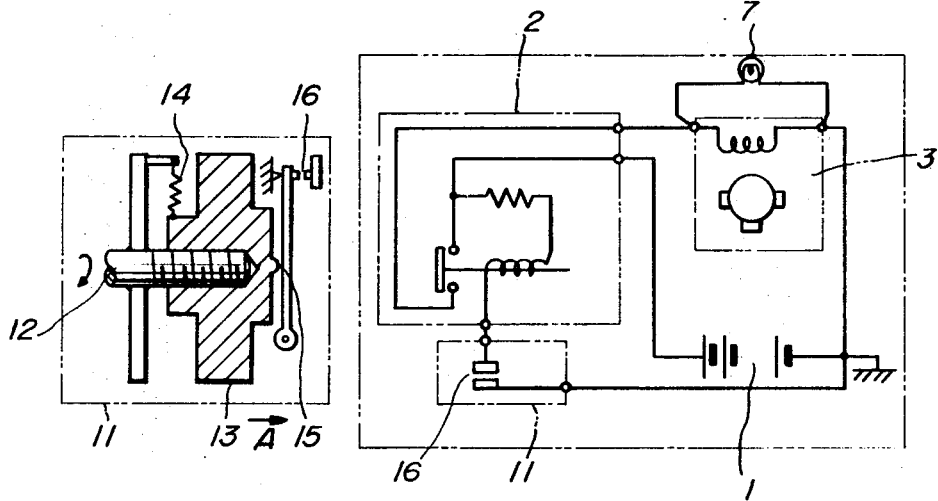
FIG. 2 is an electrical connection diagram showing a conventional electromagnetic antiskid device for vehicles.
Figure 3:
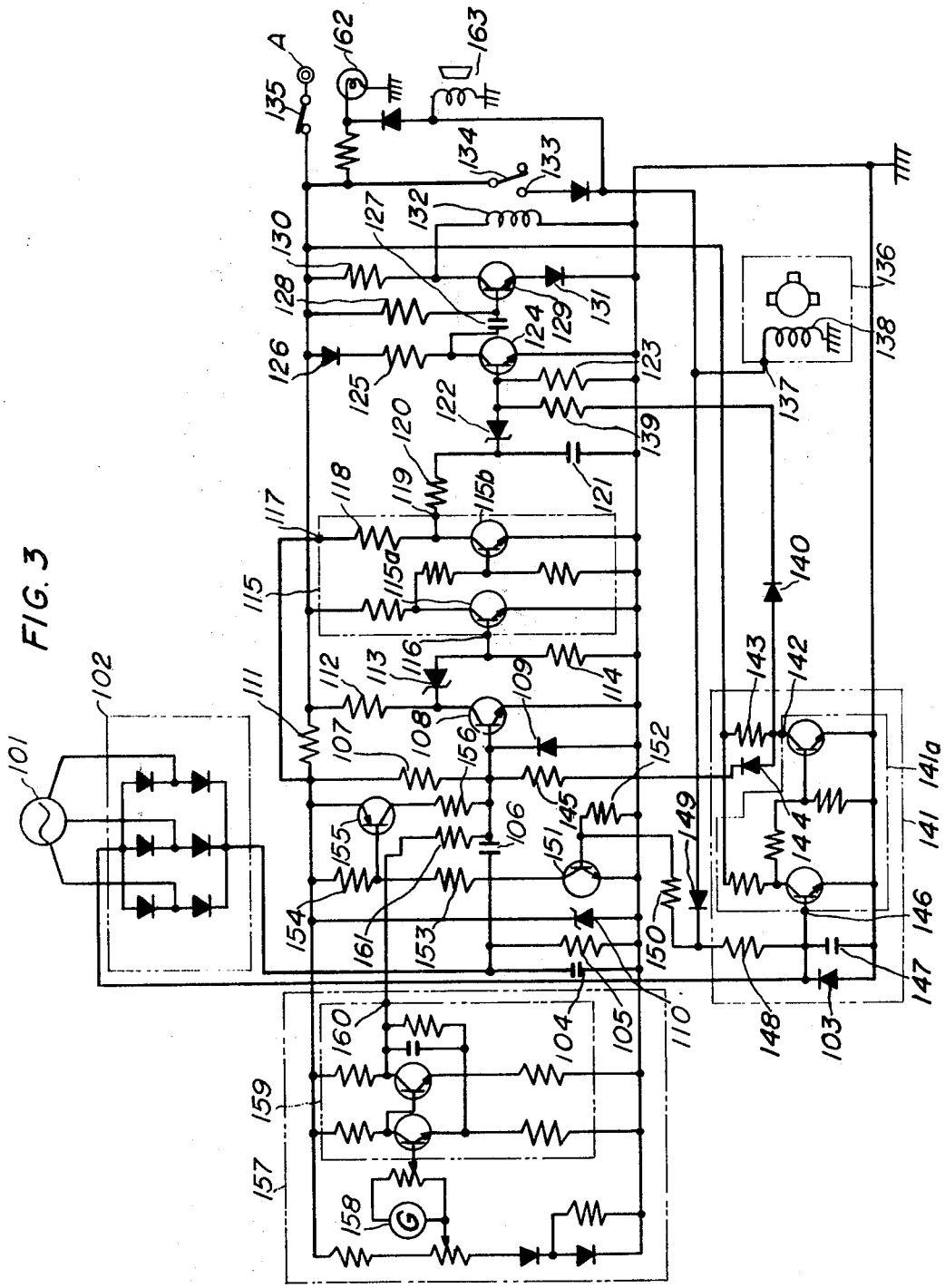
FIG. 3 is an electrical connection diagram showing an embodiment of an antiskid device according to the present invention.

The present invention will be explained hereinafter with reference to the illustrated embodiment. In FIG. 3, numeral 101 designates a three-phase AC generator whose rotor is so arranged that it responds to the rotation of the wheel to thereby provide the AC voltage proportional to said rotation of the wheel. Numeral 102 is a three-phase full-wave rectifier circuit; 103 a diode to detect whether the wheel is rotating, the diode being inserted between said three-phase full-wave rectifier circuit 102 and the ground so that a negative voltage is developed at the negative side of the diode 103 by the output of the three-phase AC generator 101 while the wheel is rotating. Numeral 104 is a capacitor and 105 is a resistor which forms with the capacitor 104 a smoothing circuit of the rectifier circuit 102. Numeral 106 is a capacitor and 107 a resistor which forms a differentiation circuit with the capacitor 106, said differentiation circuit being adapted to produce the variations of the DC voltage smoothed out by the capacitor 104 and the resistor 105. Numeral 108 designates a transistor whose base current is supplied from the resistor 107 and which amplifies at the same time the signal voltage differentiated by the capacitor 106 and the resistor 107. Numeral 109 is a diode adapted to prevent a large reverse voltage from being applied between the base and emitter of the transistor 108 through the discharging of the charge in the capacitor 106 caused by the sudden stoppage of rotation of the wheel, the diode being inserted between the base and ground of the transistor 108. Numeral 110 designates a reference diode; 111 a resistor, the reference diode 110 and the resistor 111 being adapted to always provide a constant voltage across the resistor 107 against variations in the supply voltage of the vehicle. Numeral 112 is a collector resistor of the transistor 108; 113 a reference diode; 114 a resistor. When the transistor 108 is driven to its cutoff state, current flows from the source of power through the resistor 112, reference diode 113 and through the resistor 114 causing a signal voltage across the resistor 114. Numeral 115 designates an amplifier circuit comprising two transistors 115 a and 115b; 116 and input terminal of the amplifier circuit 115; 117 a reference voltage application point connected to the junction of the resistor 111 and the reference diode 110 to apply a constant voltage at all times. Numeral 118 is a resistor; 119 an output terminal of the amplifier circuit 115, the application of the signal voltage produced by the resistor 114 to the input terminal 116 causes at the output terminal 119 through the resistor 118 the signal voltage whose amplitude is constant as determined by the reference diode 110. Numeral 120 is a resistor; 121 a capacitor; 122 a reference diode; 123 a resistor, whereby following the development of the signal voltage at the output terminal 119, the signal voltage appears across the resistor 123 after a certain period of time as determined by a signal delay circuit comprising the resistors 118 and 120, capacitor 121 and reference diode 122. Numeral 124 designates a transistor to amplify the signal voltage developed across the resistor 123. Numeral 125 is a collector resistor of the transistor 124; 126 a diode adapted to prevent the discharge of a capacitor 127 when the supply voltage of the vehicle drops. Numeral 128 designates a resistor. The resistor 128 and the capacitor 127 are designed to function such that if the transistor 124 fails and is short circuited, a transistor 129 is maintained in its cutoff state for a certain period of time as determined by the values of the capacitor 127 and the resistor 128, while on the other hand if the transistor 124 is operating normally, the transistor 129 is driven to cutoff only when the transistor 124 becomes conductive. Numeral 130 is a resistor; 131 a diode adapted to prevent a reverse voltage from being applied between the base and emitter of the transistor 129 through the discharge of the charge in the capacitor 127 as the transistor 124 is turned from its cutoff state into its on condition, the diode being inserted between the emitter and ground of the transistor 129. Numeral 132 is an exciting coil; 133 a fixed contact; 134 a movable contact adapted to be actuated upon energization of the exciting coil 132. Numeral 135 designates a power switch and designated at A is a terminal connected to the positive plates of a source battery. Numeral 136 designates a braking-force-releasing means; 137 an input terminal of the means; 138 a driving coil of the means. A relay circuit comprising the exciting coil 132, fixed contact 133 and movable contact 134 functions as switching means for controlling the energization of the braking-force-releasing means 136 and may be formed with a power transistor and a silicon-controlled rectifier element of proper rating, for example. The braking-force-releasing means is of a three-way type so that upon energization of the driving coil 138 it functions in a manner designed to block the side of the air tank (not shown) and establishes communication between a brake chamber and an exhaust port (both not shown) to thereby release the braking force applied on the wheel, whereas it functions to communicate the air tank to the brake chamber when the driving coil is deenergized. Numeral 139 a resistor; 140 a diode, the resistor 139 and the diode 140 being connected in series, the other end of the resistor 139 being connected to the base of the transistor 124 and the other end of the diode 140 to output terminal 142 of amplifier 141a of a wheel rotation detection circuit 141. The wheel rotation detection circuit 141 utilizes a negative voltage developed across the diode 103. Numeral 143 is a resistor inserted between the switch 135 and the output terminal 142 of the amplifier circuit 141a. Numeral 144 is a diode; 145 a resistor, the diode 144 being connected in series with the resistor 145 so that if the signal voltage is developed at the output terminal 142 of the amplifier circuit 141a, the signal voltage is applied to the base electrode of the transistor 108 to cause it to become conductive, thus preventing the signal voltage from being applied to the input terminal 116 of the amplifier circuit 115. Numeral 146 is an input terminal of the amplifier circuit 141a; 147 a capacitor; 148 a resistor; 149 a diode. The input terminal 146 is connected to the fixed contact 133 through the resistor 148 and the diode 149. The capacitor 147 is inserted between the input terminal 146 and the ground to remove the AC component included in the DC voltage developed across the diode 103. Numeral 150 is a resistor; 151 a transistor; 152 a resistor. The resistor 150 is connected at one end thereof to the fixed contact 133 through the diode 149 and to the base of the transistor 151 at the other end. The resistor 152 is connected between the base and ground of the transistor 151 so that when the fixed contact 133 and the movable contact 134 are opened, the base of the transistor 151 is prevented from being disconnected. Numerals 153 and 154 are resistors; 155 a transistor; 156 a resistor, the resistor 153 forming the collector resistor of the transistor 151 and providing base current of the transistor 155 when the transistor 151 is conductive. The resistor 154 is placed between the base and emitter of the transistor 155 and functions to prevent the base of the transistor 155 from being disconnected when the transistor 151 is cut off. The emitter of the transistor 155 is also connected to the junction of the reference diode 110 and the resistor 111. The resistor 156 also forms the collector resistor of the transistor 155 and is connected at the other end thereof to the base electrode of the transistor 108. An angular wheel deceleration detector is formed with the differentiation circuit comprising the capacitor 106 and resistor 107, the transistor 108 and others. Numeral 157 designates a vehicle deceleration detector; 158 a deceleration generator adapted to produce a voltage corresponding to the deceleration of the vehicle; 159 an amplifier circuit to amplify the generated voltage of the deceleration generator 158; 160 the output terminal of the amplifier circuit. Numeral 161 is a resistor; 162 a lamp; 163 a buzzer.

Now, with the arrangement described above the operation of the device according to the present invention will be explained hereinafter. During the normal driving of the vehicle, the capacitor 106 is charged with the generated voltage of the three-phase AC generator 101. On the other hand, although the output voltage of the vehicle deceleration generator 158 is almost zero, the voltage appearing at the output terminal 160 of the vehicle deceleration detector 157 has a certain value so that the transistor 108 is conductive by virtue of the base current supplied thereto through the resistors 107 and 161. Here, if the value at which the angular deceleration of the wheel will be detected is based on the base current of the transistor 108, it is determined by the ohmic values of the resistors 107 and 161 and will be regarded hereinafter as a first predetermined value.

Now assume that the braking force is applied to the wheel on a road where the coefficient of road adhesion is low, as would be the case on a snowy frozen road surface. Then, as the coefficient of road adhesion is low, the deceleration of the vehicle is not very large assuming a value which corresponds to the adhesion coefficient of the road and the generated voltage of the deceleration generator 158 is low. Nevertheless, the voltage developed at the output terminal 160 by virtue of the generated voltage of the deceleration generator 158 provides through the resistor 161 the supply of current to the base of the transistor 108 which is larger than would be the case during the normal driving of the vehicle and this base current is further increased by the addition of current flowing from the power source through the resistors 107 and 161. In other words, the first predetermined value for detecting the angular deceleration of the wheel changes in response to the deceleration of the vehicle which is not very large in this instance as already mentioned. On the other hand, the peripheral wheel speed drops with a relatively large angular deceleration because of the low coefficient of road adhesion with a resultant decrease in the generated voltage of the three-phase AC generator 101. When this happens, the charge stored in the capacitory 106 is discharged by the discharge circuit comprising the smoothing condenser 104, resistor 105 and diode 109 and this discharge current flows in the direction to cancel the base current of the transistor 108. Then, if an angular wheel deceleration occurs which is so large that the wheels tend to be locked under an excessively large braking force, the sudden drop in the generated voltage of the AC generator 101 causes the discharge current of the capacitor 106 to completely cancel the base current of the transistor 108 to drive the transistor 108 to cutoff. That is, as the angular wheel deceleration exceeds the first predetermined value and the angular wheel deceleration detector provides a braking-force-releasing signal, the reference diode 113 becomes a conductor, whereupon current flows from the source battery (not shown) through the resistor 112, the reference diode 113 and the resistor 114 to develop the signal voltage across the resistor 114. This signal voltage is then amplified by the amplifier circuit 115 to deliver the fixed amplitude signal voltage at its output terminal 119. Then, after a certain period of time as determined by the resistors 118 and 120, the capacitor 121 and the reference diode 122, the signal voltage is developed across the resistor 123. Supplied with base current by this signal voltage, the transistor 124 becomes a conductor driving the transistor 129 to cutoff. As a result, current flows into the exciting coil 132 from the source battery through the resistor 130 and the fixed contact 133 and the movable contact 134 close, whereupon the braking-force-releasing means 136 is actuated by the energization of the driving coil 138 and operates in a manner designed to release the braking force applied to the wheel. At the same time, the circuit is closed to the buzzer 163 and the lamp 162, whereby the driver recognizes, by the warning sound emanating from the buzzer 163 and the increased brilliance of the lamp 162, the presence of the danger that locking of the wheel is likely to take place.

On the other hand, upon closing of the fixed contact 133 and the movable contact 134, the base current is fed back to the transistor 151 from the source battery through the closed contacts 133 and 134 and through the diode 149 and the resistor 150 to turn the transistor 151 on. This has a further effect that current flows into the base electrode of the transistor 155 through the resistor 153 and the transistor 155 conducts. The result is that now more current is supplied to the base of the transistor 108 by the addition of a current flowing through the resistors 107 and 156 and a current flowing through the resistor 161 by virtue of the voltage developed at the output terminal 160 of the vehicle deceleration detector 157, thus newly establishing a second predetermined value which is higher than the first predetermined value. In this instance, if the angular deceleration being developed in the wheel has a value smaller than the second predetermined value, the supply of current to the exciting coil 132 is cut off again after the lapse of a very short time as determined by the magnitude of the angular deceleration presently developed in the wheel, and the fixed contact 133 and the movable contact 134 now open. Thus the braking-force-releasing means 136 operates in a manner designed to increase the braking force. This happens by virtue of the fact that because of the current flowing through the resistors 107 and 156, current flowing through the capacitor 106 does not, upon the change from the first predetermined value to the second predetermined value, permit the base current of the transistor 108 to decrease to such an extent as to maintain the voltage between the collector and emitter at a sufficiently large value. However, during the time the contacts 133 and 134 remain closed, the magnitude of the braking force is balanced by the delay time in the operation of the brake system. Thus, the magnitude of the braking force is reduced to slightly lower than would be the case when the braking-force-releasing means 136 does not operate at all. By repeating the above-described process of operation, the speed of the vehicle is reduced without causing the wheel to stop rotating and without completely releasing the braking force applied to the wheel. On the other hand, if the magnitude of the angular deceleration being developed in the wheel has a value which is larger than the second predetermined value when the predetermined value of the angular wheel deceleration changes from the first to the second predetermined value, the base current of the transistor 108 is continuously cancelled by the discharge current of the capacitor 106 and the voltage between the collector and emitter of the transistor 108 is maintained at a value close to that of the supply voltage. As a result, the fixed contact 133 and the movable contact 134 continue to remain closed and the braking-force-releasing means 136 remains operating in a manner designed to release the braking force on the wheel. This causes the angular deceleration of the wheel to go below the second predetermined value and, while it is between the second and the first predetermined values, the braking-force-releasing means 136 operates in a manner designed to apply the braking force to the wheel as described above, although the braking force is not applied immediately because of the delayed action of the brake system. Thus, the angular deceleration of the wheel continues to drop until it becomes lower than the first predetermined value, whereupon the braking force is actually applied and the angular deceleration of the wheel starts to rise again. Thereafter, the repetition of the same process of operation ensures that the speed of the vehicle is slowed down without causing the wheel to stop rotating.

If, for example, the rotational speed of the wheel decreases with the angular deceleration in excess of a certain angular deceleration and then the wheel stops rotating, the fixed contact 133 and the movable contact 134 close due to the angular deceleration of the wheel that takes place in the course of braking until the rotation of the wheel is brought to a stop and the braking force releasing means 136 operates towards releasing the braking force on the wheel. At the same time, this stoppage of rotation of wheel results in the extinction of the negative voltage at the negative side of the diode 103 which acts as a wheel-rotation-signal-detecting element, and thus current flows into the input terminal 146 of the amplifier circuit 141a from the source battery through the closed contacts 133 and 134 and through the diode 149 and the resistor 148, thus causing a signal voltage at the output terminal 142. Whereupon this signal voltage supplies current to the base of the transistor 124 through the diode 140 and the resistor 139 so that the transistor 124 remains conductive as would be the case when a wheel deceleration signal is sent while the wheel is rotating. As a result, the fixed contact 133 and the movable contact 134 continue to remain closed and the braking-force-releasing means 136 operates towards reducing the braking force on the wheel. In other words, even though the angular wheel deceleration signal disappears due to the stoppage of rotation of the wheel, the signal voltage developed at the output terminal 142 of the amplifier circuit 141a causes the contacts 133 and 134 to remain closed and it is thus ensured that no braking force is applied again on the wheel while the rotation of the wheel is being stopped. Then, as the wheel starts rotating again because of the friction between the wheel and road, a negative voltage is developed at the negative side of the diode 103. This negative voltage is then applied to the input terminal 106 of the amplifier circuit 141a so that there is no longer developed any signal voltage at the output terminal 142 of the amplifier circuit 141a. With no signal voltage applied to the base electrode of the transistor 124, this transistor is driven to cutoff while transistor 129 becomes conductive. Thus, the supply of current to the exciting coil 132 is cut off again to open the fixed contact 133 and the movable contact 134 in a manner designed to effect immediate application of the braking force on the wheel. In this connection, if the wheel rotating at high speed is brought to a sudden stop and starts rotating again immediately thereafter, the discharge of the remaining charge in the capacitor 106 maintains the continued development of the signal voltage at the collector electrode of the transistor 108 over a certain period of time even after the signal voltage at the output terminal 142 of the amplifier circuit 141a has disappeared and this signal voltage causes the braking-force-releasing means 136 to operate towards releasing the braking force on the wheel. In order to prevent this, the signal voltage developed at the output terminal 142 of the amplifier circuit 141a upon stoppage of the wheel may be utilized to supply a current to the base electrode of the transistor 108 through the diode 144 and the resistor 145 so that the negative base voltage of the transistor 108 is cancelled to turn this transistor on, thereby preventing the signal voltage from appearing at the collector electrode of the transistor 108.

Now the functions of the signal delay circuit comprising the resistors 118 and 120, capacitor 121 and reference diode 122 will be explained further. When the signal voltage is developed at the output terminal 119 of the amplifier circuit 115, the capacitor 121 charges with a time constant which is determined by the capacitance of the capacitor 121 and the ohmic values of the resistors 118 and 120. And then, as the terminal voltage of the capacitor 121 exceeds the breakdown voltage of the reference diode 122, the transistor 124 starts to conduct and the signal voltage at the output terminal 119 of the amplifier circuit 115 consequently disappears, whereupon the charge in the capacitor 121 is discharged through the resistor 120 and between the collector and emitter of the transistor 115b with a time constant determined by the ohmic value of the resistor 120 and the resistance between the collector and emitter of the transistor 115b. In other words, only when the duration of the signal voltage developed at the output terminal 119 of the amplifier circuit 115, that is, the duration of the braking-force-releasing signal continues over a certain delay time as determined by the charging time constant of the capacitor 121 and the breakdown voltage of the reference diode 122, does the delay circuit permit the passage of the braking-force-releasing signal developed at the output terminal 119 through to the following stage. Therefore, allowing for the fact that the wheel deceleration exceeds the first predetermined value due to the unsteady rotation of the wheel upon application of the brakes to the vehicle and a braking-force-releasing signal is generated, the duration of this signal will never extend as long as that of the aforesaid certain delay time and the braking force releasing signal provided, for example, by the unsteady rotation of the wheel can be blocked by the delay circuit.

On the other hand, application of the braking force on the wheel on a road where the coefficient of road adhesion is higher than in the case of the above described frozen road surface but lower than in the case of a dry asphalt road surface, shows that the difference between the deceleration of the vehicle and the angular wheel deceleration is not very large, and the first predetermined value assumes a value which corresponds to the deceleration of the vehicle by the vehicle deceleration detector 157. However, although the deceleration of the vehicle does not exceed a certain value which is determined according to the coefficient of road adhesion, the angular wheel deceleration increases in accordance with the braking force applied to the wheel. For this reason a locked wheel is avoided by the actuation of the braking-force-releasing means 136 which is effected through the same circuitry operation as previously described with respect to the operation on a snowy frozen road surface.

If the braking force is applied to the wheel on a road where the coefficient of road adhesion is as high as on a dry asphalt road surface, the deceleration of the vehicle assumes, according to the adhesion coefficient of the road, a considerably larger value as compared to the case of a snowy frozen road surface and the first predetermined value for detecting the angular wheel deceleration is set to a higher value corresponding to the vehicle deceleration. Whereas, the angular wheel deceleration assumes a relatively small value because of the higher coefficient of road adhesion so that if no angular deceleration is developed in the wheel in excess of the first predetermined value, the braking-force-releasing means 136 is not actuated, whereas it is actuated through the same circuitry operation as previously described with respect to the operation on a snowy frozen road surface if the braking-force-releasing signal is sent just before the wheel is locked. In this way, a locked wheel is also avoided.

Besides, if the driver closes the power switch 135 before he starts the vehicle running, the base current of the transistor 108 which is supplied through the resistors 111 and 107 is cut off over a period time as determined by the resistors 111 and 107 and by the capacitors 106 and 104. When this happens, the same action takes place as if a braking-force-releasing signal is sent, that is, the exciting coil 132 is energized to close the fixed contact 133 and the movable contact 134 and the braking-force-releasing means 136 operates in a manner designed to release the braking force, while the buzzer 163 gives an audible alarm. In this instance, there is no possibility that this releasing of the braking force, though only for a short time, may act in such a manner as to start the vehicle running, for example, under the influence of the gradient of the road. The reason is that if the wheel then starts rotating, the circuit is immediately opened to the braking-force-releasing means 136 by the action of the wheel rotation detector 141 as previously described and the braking force is applied to the wheel again. In addition, if the driver of the vehicle opens the power switch 135 for some reason or other while he is driving the vehicle and then closes the switch again, no base current supplied to the transistor 108 through the resistors 111 and 107 is permitted to flow into the capacitor 106 because the DC voltage is developed across the capacitor 104 which corresponds to the speed of the vehicle and thus no releasing of the braking force takes place. On the other hand, if anything is wrong with the antiskid device described above, the circuit is not closed to the exciting coil 132 so that the movable contact 134 and the fixed contact 133 are not closed and the circuit is not closed to the buzzer 163, too. Thus, no audible alarm will be provided.

It is evident from the foregoing that when the driver closes the power switch 135 before he starts the vehicle running, he can notice the presence of any effect in the antiskid device depending whether an audible alarm is emanating or not.

We claim:

1. An antiskid device for use in a vehicle having wheels and a braking system, said device comprising:
    wheel-speed-detecting means for generating a DC voltage proportional to wheel speed,
    differentiating means for differentiating said DC voltage thereby generating a wheel deceleration signal,
    wheel-deceleration-detecting means for generating a brake-force-releasing signal when said deceleration signal exceeds a set value,
    vehicle-deceleration-detecting means for generating a vehicle deceleration signal corresponding to vehicle deceleration,
    set-value-changing means for changing said set value of said wheel-deceleration-detecting means in response to said vehicle deceleration signal,
    a switch element actuatable by said brake releasing signal, and
    a brake-force-releasing element for releasing a breaking force when actuated upon actuation of said switch element.

2. An antiskid device according to claim 1 including:
    feedback means for applying a feedback signal to said wheel deceleration detector upon the actuation of said switching means to thereby change said predetermined value from an initial value to a higher value thus causing intermittent operation if the wheel deceleration is greater than said initial value but less than said higher value.

3. An antiskid device according to claim 2 further including:
    a signal delay circuit connected between said wheel deceleration detector and said switching means for passing said brake-force-releasing signal only when the duration of said brake-force-releasing signal continues over a certain predetermined time.

4. An antiskid device according to claim 2 further including:
    a wheel rotation detector means for detecting whether the wheel is rotating or not after energization of said switch means and for causing the energization of said brake-force-releasing means through said switching means to be maintained by an output of said wheel-rotation-detecting circuit.

5. An antiskid device according to claim 4 further including:
    a signal delay circuit connected between said wheel deceleration detector and said switching means for passing said brake-force-releasing signal only when the duration of said brake-force-releasing signal continues over a certain predetermined period of time.